(12) United States Patent
Lewis

(10) Patent No.: US 10,203,944 B1
(45) Date of Patent: Feb. 12, 2019

(54) SYSTEMS AND METHODS FOR DYNAMICALLY CUSTOMIZING SOFTWARE PROGRAMS

(71) Applicant: Symantec Corporation, Mountain View, CA (US)

(72) Inventor: Brook Lewis, New York, NY (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/342,769

(22) Filed: Nov. 3, 2016

(51) Int. Cl.
*G06F 8/60* (2018.01)
*G06F 8/20* (2018.01)
*H04L 29/08* (2006.01)
*H04L 29/06* (2006.01)

(52) U.S. Cl.
CPC ............... *G06F 8/60* (2013.01); *G06F 8/20* (2013.01); *H04L 67/34* (2013.01); *H04L 67/42* (2013.01)

(58) Field of Classification Search
CPC .................................................. G06F 8/20
USPC ........................................................ 717/110
See application file for complete search history.

(56) References Cited

U.S. PATENT DOCUMENTS

| | | | | |
|---|---|---|---|---|
| 2005/0071810 A1* | 3/2005 | Sutter | ............... | G06F 8/36 717/116 |
| 2005/0132083 A1* | 6/2005 | Raciborski | ............. | G06F 21/10 709/232 |
| 2006/0143135 A1* | 6/2006 | Tucker | ............... | G06F 21/121 705/59 |
| 2011/0106875 A1* | 5/2011 | Koenig | ............... | G06Q 30/018 709/203 |
| 2012/0084399 A1* | 4/2012 | Scharber | ............... | H04L 67/34 709/219 |
| 2013/0124606 A1* | 5/2013 | Carpenter | ............... | H04L 67/06 709/203 |
| 2015/0026675 A1* | 1/2015 | Csaszar | ............... | G06F 8/61 717/178 |
| 2015/0358389 A1* | 12/2015 | Vytla | ............... | H04L 67/42 709/203 |
| 2016/0080344 A1* | 3/2016 | Ochs | ............... | H04L 63/08 726/4 |

* cited by examiner

*Primary Examiner* — James D. Rutten
(74) *Attorney, Agent, or Firm* — FisherBroyles, LLP

(57) ABSTRACT

The disclosed computer-implemented method for dynamically customizing software programs may include (i) receiving, from a client device, a request for a software program with client-specific customization requirements and (ii) providing, to the client device, a digitally signed download manager for downloading a client-specific version of the software program that satisfies the client-specific customization requirements, where the digitally signed download manager provides the client-specific version of the software program to the client device by (a) downloading, from the backend computing system, both the software program and client-specific data that satisfies the client-specific customization requirements and (b) customizing, using the client-specific data, the software program in a manner that satisfies the client-specific customization requirements. Various other methods, systems, and computer-readable media are also disclosed.

20 Claims, 7 Drawing Sheets

SYSTEMS AND METHODS FOR DYNAMICALLY CUSTOMIZING SOFTWARE PROGRAMS

BACKGROUND

Software publishers and distributors often want to be able to customize software programs for their clients. For example, a software publisher may produce different versions of a software program for various operating systems, hardware platforms, corporate customers, or regional markets. Similarly, software programs may be localized according to language, national conventions, or cultural differences. In addition, software distributors may distribute multiple software programs for multiple software publishers, leaving the distributor with the task of delivering the correct version of the correct software program to each client. Software licensing is also a form of customization, where the software program as a whole or separate features of the program are activated according to the user's software license.

Unfortunately, an increasing need for information security has made it more difficult to customize software programs. While it was once possible to add custom information to a software program just before delivery, many operating systems and organizational security policies now make it difficult or even impossible to alter the contents of a digitally signed software program without breaking the software program's digital signature. Customizing and digitally signing a software program at delivery time is a resource intensive process that may make the time needed to deliver a software program undesirably long. The instant disclosure, therefore, identifies and addresses a need for systems and methods for dynamically customizing software programs.

SUMMARY

As will be described in greater detail below, the instant disclosure describes various systems and methods for dynamically customizing software programs. In one example, a computer-implemented method for dynamically customizing software programs may include (i) receiving, from a client device, a request for a software program with client-specific customization requirements and (ii) providing, to the client device, a digitally signed download manager for downloading a client-specific version of the software program that satisfies the client-specific customization requirements, where the digitally signed download manager provides the client-specific version of the software program to the client device by (a) downloading, from the backend computing system, both the software program and client-specific data that satisfies the client-specific customization requirements and (b) customizing, using the client-specific data, the software program in a manner that satisfies the client-specific customization requirements.

In some examples, the computer-implemented method may further include (i) generating the digitally signed download manager by including a unique identifier in a file containing executable code for the digitally signed download manager and (ii) digitally signing the executable code file to produce the digitally signed download manager. In some examples, the computer-implemented method may further include generating a group of digitally signed download managers before receiving the request from the client device. In one embodiment, each of the digitally signed download managers may be associated with at least one of a group of download manager classes and/or each download manager class may be associated with a customized version of the software program. In example, the computer-implemented method may further include identifying, based on the client-specific data, the download manager class that satisfies the client-specific customization requirements.

In some examples, providing the digitally signed download manager may include (i) providing, to the client device, a network location associated with the unique identifier, (ii) receiving, from the client device at the network location, a request for the digitally signed download manager, and (iii) in response to receiving the request for the digitally signed download manager, transmitting the digitally signed download manager to the client device from the network location. In some examples, the computer-implemented method may further include identifying the client-specific data by identifying a user associated with the client device, an organization associated with the client device, a location for the client device, a language used by the client device, an operating system version used by the client device, a network address associated with the client device, system configuration information for the client device, a software publisher providing the software program to the client device, and/or a license for the software program to be downloaded. In one embodiment, the client-specific data may include a software license, a localization file, and/or a virtualization container.

In one embodiment, a system for implementing the above-described method may include several modules stored in memory, such as (i) a receiving module that receives, from a client device, a request for a software program with client-specific customization requirements, (ii) a provisioning module that provides, to the client device, a digitally signed download manager for downloading a client-specific version of the software program that satisfies the client-specific customization requirements, where the digitally signed download manager provides the client-specific version of the software program to the client device by downloading, from the backend computing system, both the software program and client-specific data that satisfies the client-specific customization requirements, and (iii) a customizing module that customizes, using the client-specific data, the software program in a manner that satisfies the client-specific customization requirements. The system may also include at least one physical processor configured to execute the receiving module, the provisioning module, and the customizing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, from a client device, a request for a software program with client-specific customization requirements and (ii) provide, to the client device, a digitally signed download manager for downloading a client-specific version of the software program that satisfies the client-specific customization requirements, where the digitally signed download manager provides the client-specific version of the software program to the client device by (a) downloading, from the backend computing system, both the software program and client-specific data that satisfies the client-specific customization requirements and (b) customizing, using the client-specific data, the software program in a manner that satisfies the client-specific customization requirements.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
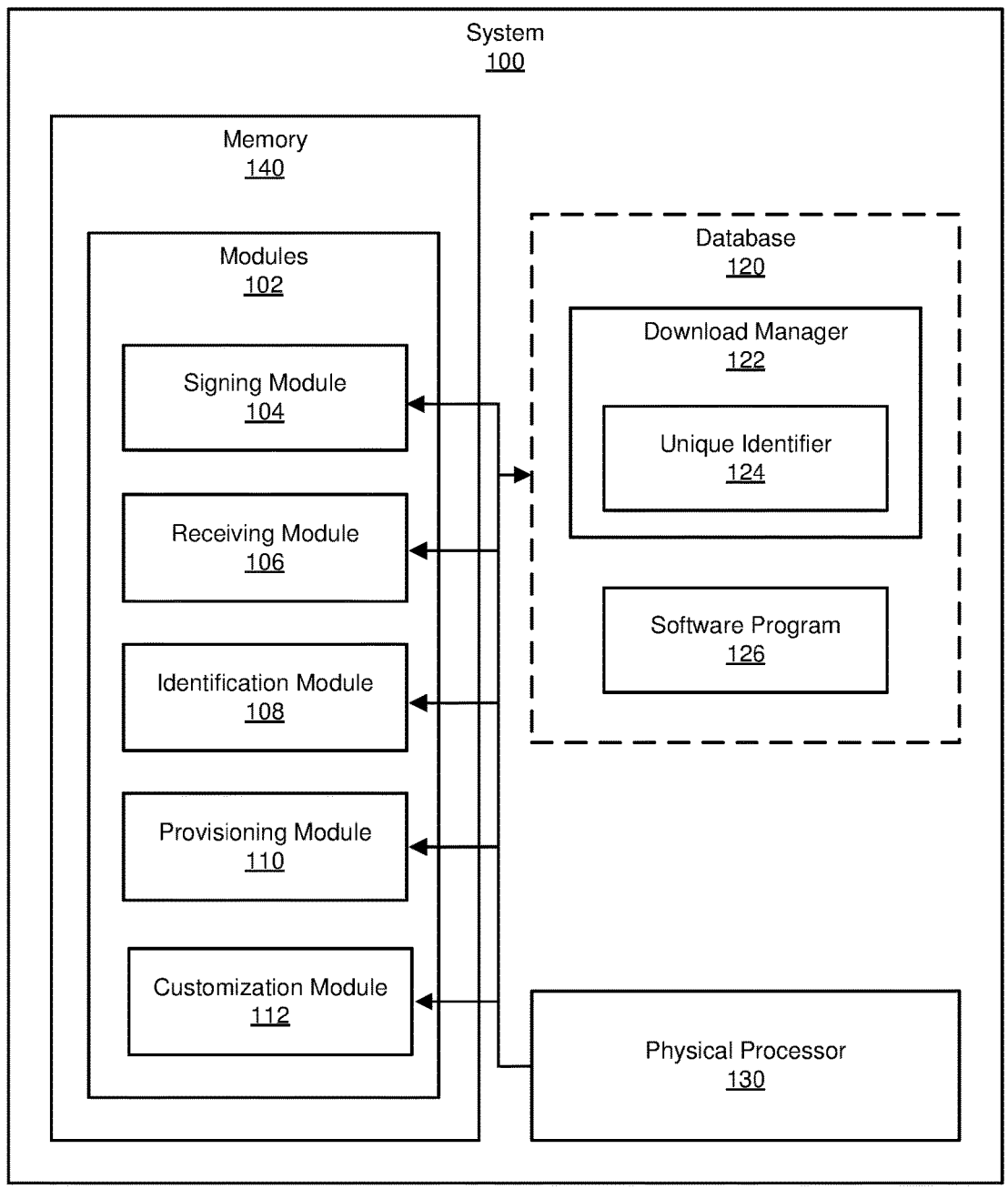
FIG. 1 is a block diagram of an example system for dynamically customizing software programs.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for dynamically customizing software programs. As will be explained in greater detail below, by providing a digitally signed download manager for downloading a client-specific version of a software program, the systems and methods described herein may satisfy client-specific customization requirements without incurring the time and resource overhead of digitally signing files at download time. By providing the digitally signed download manager in this way, the systems and methods described herein may promptly respond to user requests to download a software program and also provide an installation and user experience customized to the client device, operating environment, and/or user needs.

In addition, the systems and methods described herein may improve the functioning of a computing device by identifying client-specific customization requirements and then identifying and compiling client-specific data to meet the client-specific customization requirements. These systems and methods may also improve the field of software program deployment, installation, and customization by transmitting software programs and the client-specific data needed to customize the software programs while observing system and/or organizational security requirements that call for digitally signed files.

The following will provide, with reference to FIGS. 1, 2, 4, and 5 detailed descriptions of example systems for dynamically customizing software programs. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of example system 100 for dynamically customizing software programs. As illustrated in this figure, example system 100 may include one or more modules 102 for performing one or more tasks. For example, and as will be explained in greater detail below, example system 100 may include a receiving module 106 that receives, from a client device, a request for a software program with client-specific customization requirements. Example system 100 may additionally include a provisioning module 110 that provides, to the client device, a digitally signed download manager for downloading a client-specific version of the software program that satisfies the client-specific customization requirements, where the digitally signed download manager provides the client-specific version of the software program to the client device by downloading, from the backend computing system, both the software program and client-specific data that satisfies the client-specific customization requirements. Example system 100 may additionally include a customization module 112 that customizes, using the client-specific data, the software program in a manner that satisfies the client-specific customization requirements. Example system 100 may also include additional modules (such as signing module 104 and identification module 108) that will be described in greater detail below. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client device 202 and/or backend device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamically customizing software programs. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store download managers and/or software programs. In some examples, database 120 may be configured to store user information, software license information, and/or client device configuration information. Database 120 may represent portions of a single database or computing device or a plurality of databases or computing devices. For example, database 120 may represent a portion of backend device 206 in FIG. 2, computing system 610 in FIG. 6, and/or portions of illustrative network architecture 700 in FIG. 7. Alternatively, database 120 in FIG. 1 may represent one or more physically separate devices (such as a public file server) capable of being accessed by a computing device, such as backend device 206 in FIG. 2, computing system 610 in FIG. 6, and/or portions of illustrative network architecture 700 in FIG. 7.

Figure 2:
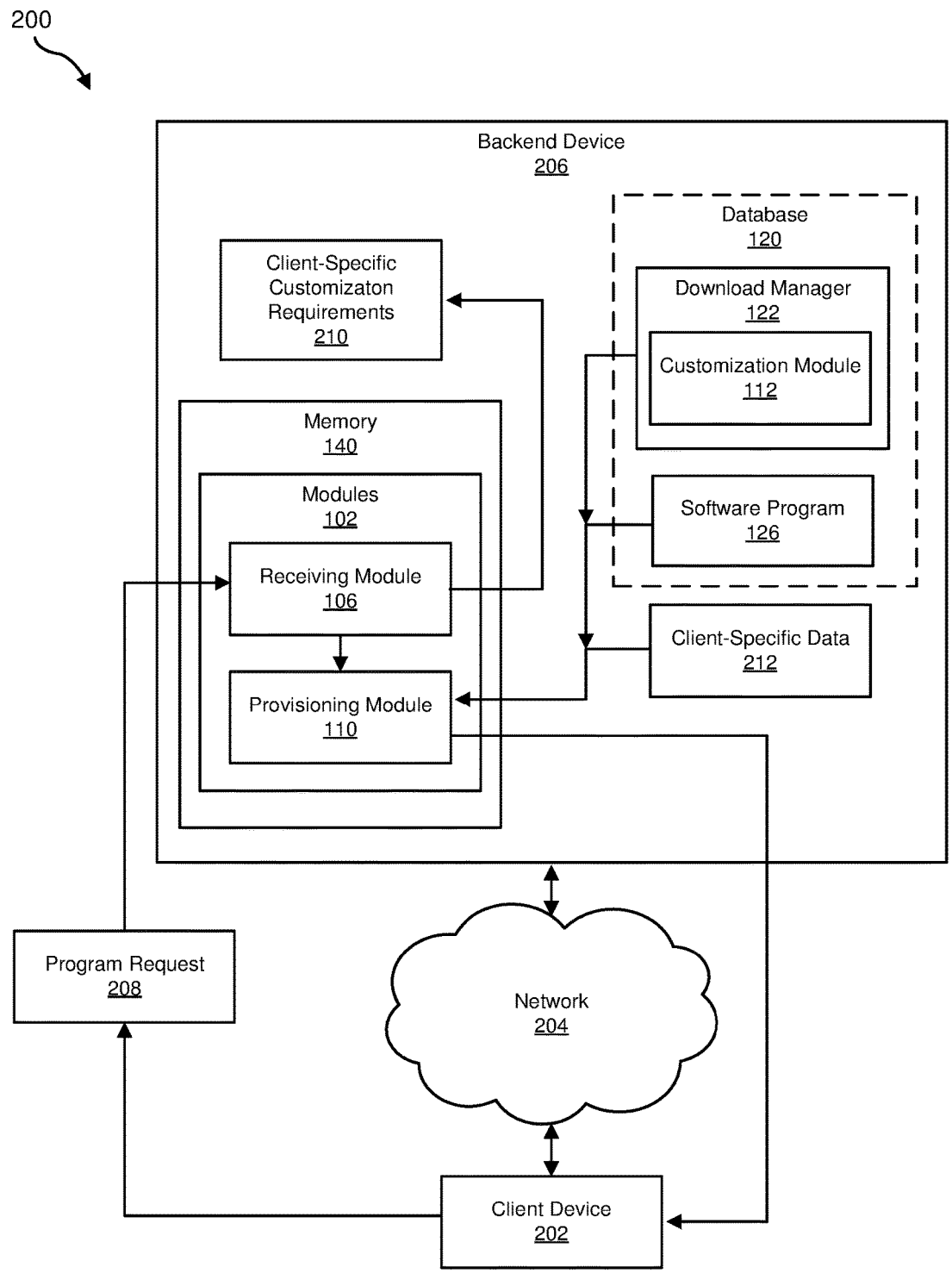
FIG. 2 is a block diagram of an additional example system for dynamically customizing software programs.

Example system 100 in FIG. 1 may be implemented in a variety of ways. For example, all or a portion of example system 100 may represent portions of example system 200 in FIG. 2. As shown in FIG. 2, system 200 may include a client device 202 in communication with a backend device 206 via a network 204. In one example, all or a portion of the functionality of modules 102 may be performed by client device 202, backend device 206, and/or any other suitable computing system. As will be described in greater detail below, one or more of modules 102 from FIG. 1 may, when executed by at least one processor of client device 202 and/or backend device 206, enable client device 202 and/or backend device 206 to dynamically customize software programs. For example, and as will be described in greater detail below, one or more of modules 102 may cause client device 202 and/or backend device 206 to dynamically customize software programs. For example, and as will be described in greater detail below, receiving module 106 may receive, from client device 202, a program request 208 for a software program 126 with client-specific customization requirements 210. Provisioning module 110 may provide, to client device 202, a digitally signed download manager 122 for downloading a client-specific version of software program 126 that satisfies client-specific customization requirements 210, where digitally signed download manager 122 provides the client-specific version of software program 126 to client device 202 by downloading, from backend device 206, both software program 126 and client-specific data 212 that satisfies the client-specific customization requirements 210. Customization module 112 may then customize, using client-specific data 212, software program 126 in a manner that satisfies the client-specific customization requirements 210.

Client device 202 generally represents any type or form of computing device capable of reading computer-executable instructions. In one example, client device may represent a computing device used to execute software application programs for a user. Additional examples of client device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Backend device 206 generally represents any type or form of computing device that is capable of receiving and servicing requests for software programs. Additional examples of backend device 206 include, without limitation, security servers, application servers, web servers, storage servers, and/or database servers configured to run certain software applications and/or provide various security, web, storage, and/or database services. Although illustrated as a single entity in FIG. 2, backend device 206 may include and/or represent a plurality of servers that work and/or operate in conjunction with one another.

Network 204 generally represents any medium or architecture capable of facilitating communication or data transfer. In one example, network 204 may facilitate communication between client device 202 and backend device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
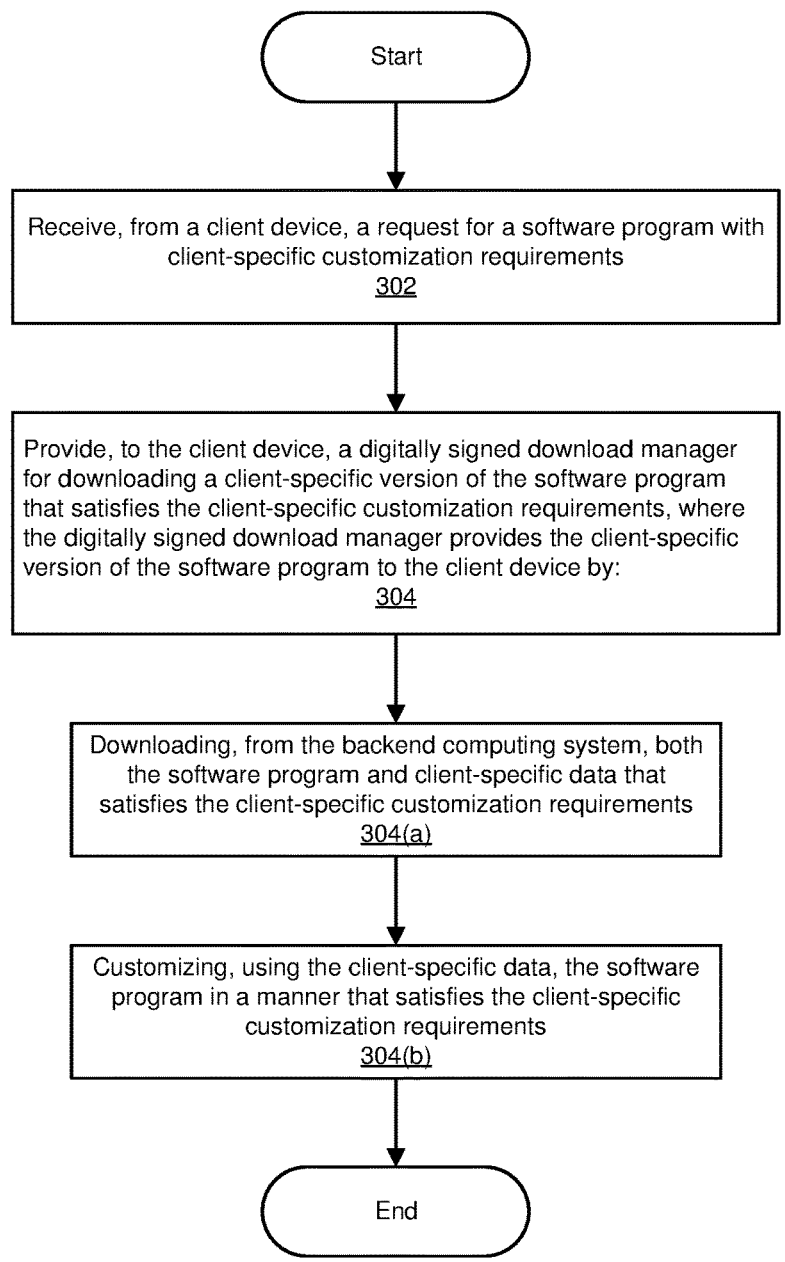
FIG. 3 is a flow diagram of an example method for dynamically customizing software programs.

FIG. 3 is a flow diagram of an example computer-implemented method 300 for dynamically customizing software programs. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, from a client device, a request for a software program with client-specific customization requirements. For example, receiving module 106 may, as part of backend device 206 in FIG. 2, receive, from client device 202, a program request 208 for a software program 126 with client-specific customization requirements 210.

Receiving module 106 may receive a request for a software program in a variety of ways. For example, receiving module 106 may receive a program request when a user of client device 202 activates a user interface control on a web page. In this example, the user may enter personal information on a form and click a button on the web page to submit the information as a program request. In another example, receiving module 106 may receive program request 208 as a purchase order from a software vendor or app store, sent via postal service, email, or other electronic form.

Client-specific customization requirements may be identified from a variety of sources. For example, the program request may include customization requirements such as the target operating system for the software program. In another example, customization requirements may be associated with a user who initiated the program request. User identification may be included in the program request or determined from information associated with the program request, such as the IP or MAC address of the client device. As will be described in greater detail below, systems described herein may identify client-specific data that may determine customization requirements.

At step 304, one or more of the systems described herein may provide, to the client device, a digitally signed download manager for downloading a client-specific version of the software program that satisfies the client-specific customization requirements. For example, provisioning module 110 may, as part of backend device 206 in FIG. 2, provide, to client device 202, digitally signed download manager 122 for downloading a client-specific version of software program 126 that satisfies client-specific customization requirements 210.

The term "download manager," as used herein, generally refers to a program that connects to one or more servers to download the files needed to install and configure a software program. Download managers are a common method for delivering software programs and may include features for accelerating the download process, such as downloading files in segments from multiple servers, or for resuming a download after a network failure. Download managers may also use hashing and code signatures to verify that the software program files have not been corrupted or modified during transmission.

Provisioning module 110 may provide a download manager that satisfies the client-specific customization requirements in a variety of ways. For example, provisioning module 110 may digitally sign download managers for downloading one or more software programs prior to receiving a request to download a software program from a client. In some examples, the systems described herein may generate the digitally signed download manager by including a unique identifier in a file containing executable code for the digitally signed download manager and digitally signing the executable code file to produce the digitally signed download manager. For example, signing module 104 may, as part of backend device 206 in FIG. 2, generate download manager 122 for downloading software program 126 by including unique identifier 124 in a file containing executable code for download manager 122 before digitally signing the file. Signing module 104 may generate several digitally signed copies of download manager 122, each copy with an identifier that uniquely identifies the copy of download manager 122.

Figure 4:
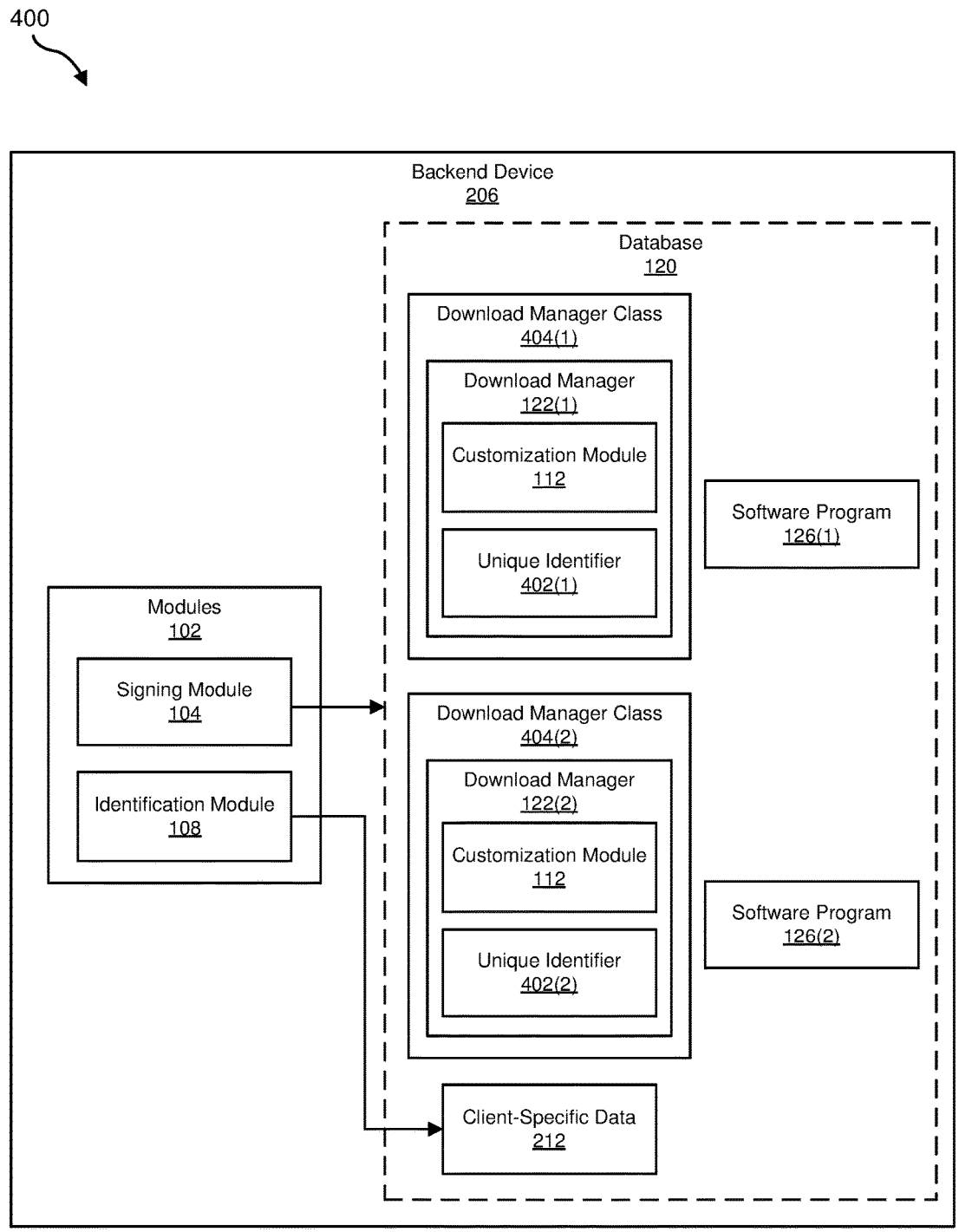
FIG. 4 is a block diagram of an example system for digitally signing download managers.

FIG. 4 is a block diagram of an example system 400 for digitally signing download managers. As illustrated in this figure, example system 400 may include backend device 206, which may include a signing module 104 that digitally signs download manager 122(1) for downloading software program 126(1). Download manager 122(1) may include unique identifier 402(1). Signing module 104 may also digitally sign download manager 122(2) for downloading software program 126(2). Download manager 122(2) may include unique identifier 402(2). Signing module 104 may digitally sign several download managers, each identified by a unique identifier, before receiving a request from a client for a software program that one or more of the download managers is designed to download.

In one embodiment, each of the set of digitally signed download managers may be associated with at least one of a set of download manager classes and/or each download manager class may be associated with a customized version of the software program. For example, as illustrated in FIG. 4, download manager 122(1) may be associated with download manager class 404(1), which is associated with software program 126(1). In addition, download manager 122(2) may be associated with download manager class 404(2), which is associated with software program 126(2).

In one embodiment, the systems described herein may identify, based on the client-specific data, the download manager class that satisfies the client-specific customization requirements. As illustrated in FIG. 4, and as will be described in greater detail below, identification module 108 may identify client-specific data 212. Based on client-specific data 212, identification module 108 may determine which download manager class 404 satisfies the client-specific customization requirements. After receiving program request 208, provisioning module 110 may determine which software program the client device is requesting and provide a download manager from the download manager class associated with the software program.

In some examples, provisioning module 110 may provide the digitally signed download manager by (i) providing, to the client device, a network location associated with the unique identifier, (ii) receiving, from the client device at the network location, a request for the digitally signed download manager, and (iii) in response to receiving the request for the digitally signed download manager, transmitting the digitally signed download manager to the client device from the network location.

Figure 5:
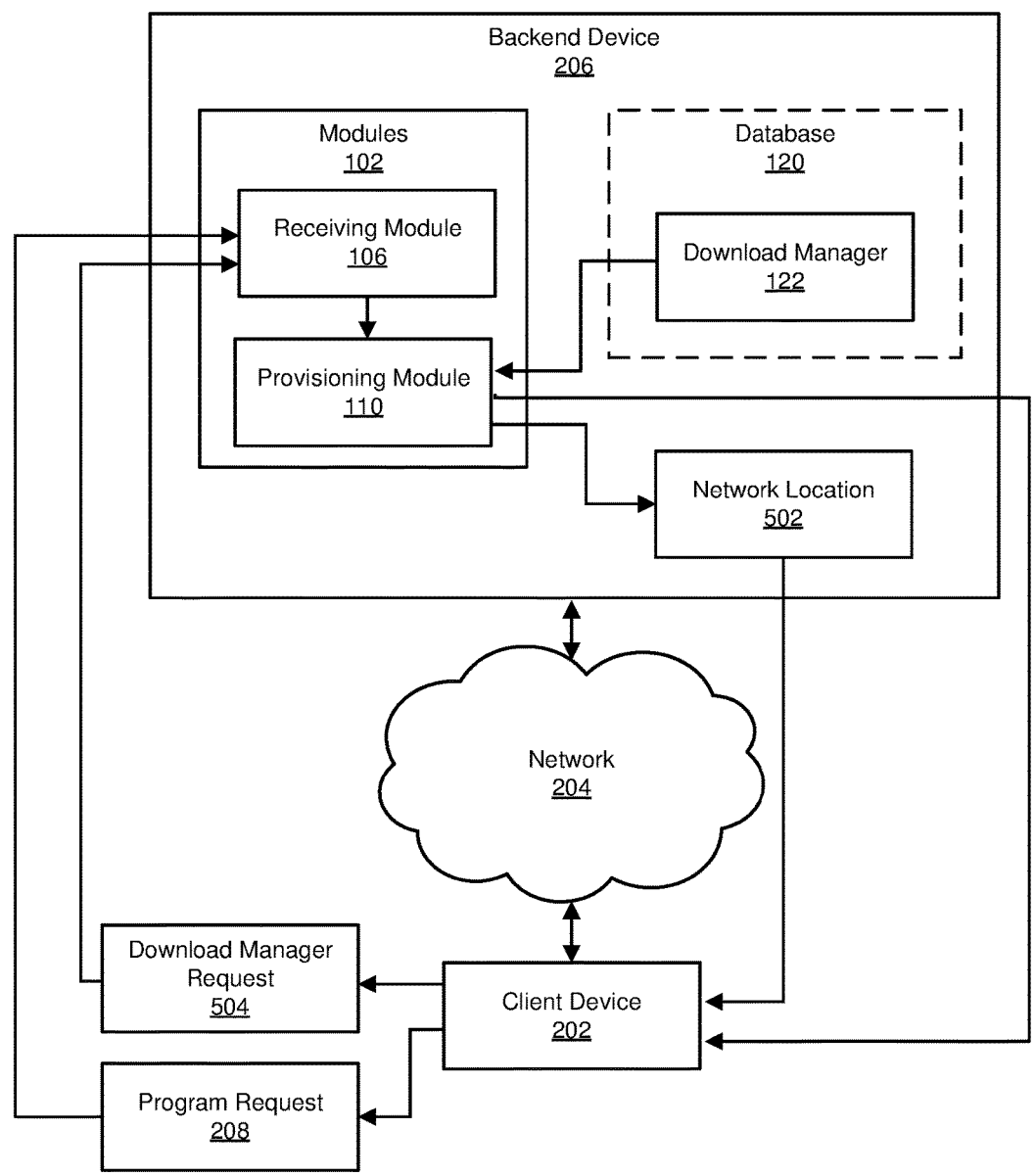
FIG. 5 is a block diagram of an example system for downloading digitally signed download mangers.

FIG. 5 is a block diagram of an example system 500 for downloading digitally signed download mangers. As illustrated in this figure, example system 500 may include client device 202 in communication with backend device 206, via network 204. In response to receiving program request 208, receiving module 106 may direct provisioning module 110 to provide client device 202 with a network location 502, which is associated with download manager 122. In one example, network location 502 is a unique network location associated with the unique identifier digitally signed in download manager 122. In another example, network location 502 is a network location associated with unique identifiers digitally signed in download managers in a download manager class.

After provisioning module 110 has provided network location 502 to client device 202, receiving module 106 may receive download manager request 504 from client device 202 at network location 502. Provisioning module 110 may determine that network location 502 is associated with download manager 122 and, in response to receiving download manager request 504 at network location 502, provide download manager 122 to client device 202.

At step 304(*a*), one or more of the systems described herein may download, from the backend computing system, both the software program and client-specific data that satisfies the client-specific customization requirements. For example, download manager 122, provided to client device 202 by provisioning module 110, executing on client device 202 in FIG. 2, may receive from provisioning module 110 executing on backend computing system 206, both software program 126 and client-specific data 212 that satisfies the client-specific customization requirements 210.

Download manager 122 may receive the software program and client-specific data in a variety of ways. For example, provisioning module 110 may download the software program and client-specific data to download manager 122, executing on client device 202. Provisioning module 110 may retrieve the software program and/or client-specific data from other computing systems before transmitting them to download manager 122. For example, provisioning module 110 may retrieve a license for the software program associated with client device 202 from a licensing server. In another example, provisioning module 110 may provide download manager 122 with one or more network locations where download manager 122 may retrieve the software program and/or client-specific data.

The systems described herein may identify client-specific data in a variety of ways. For example, as shown in FIG. 5, identification module 108 may, as part of backend device 206, identify client-specific data 212. Identification module 108 may, for example, identify client-specific data by identifying a user associated with the client device. In this example, identification module 108 may identify the user by receiving user identification information with the program request. In another example, identification module 108 may identify the user by obtaining a network address, such as an IP address or MAC address, associated with the client device. Identification module 108 may also query a user information database to identify a user associated with the network address. By identifying the user, the software program may be customized with the user's name, address, and/or organizational affiliation. Identification module may also use the user identification to obtain license information for the software program or to identify a software publisher or vendor from which the user has purchased the software program.

In some examples, identification module 108 may identify a location for the client device. For example, identification module 108 may use IP address geolocation to identify a location for the client device. Identification module 108 may, for example, use information in the program request to identify a language used by the client device. In another example, identification module 108 may use a network address associated with the client device to query a database of previously collected system configuration information to identify an operating system version or system configuration for the client device. Identification module 108 may also compile location, language, and/or system configuration information to be used to provide a version of the software program customized for the computing system and/or operating environment for the software program.

At step 304(*b*), one or more of the systems described herein may customize, using the client-specific data, the software program in a manner that satisfies the client-specific customization requirements. For example, provisioning module 110 may, as part of backend device 206 in FIG. 2, use client-specific data 212 to select a version of software program 126 that satisfies client-specific customization requirements 210. Additionally or alternatively, customization module 112 may, as part of client device 202 in FIG. 2, customize, using client-specific data 212, software program 126 in a manner that satisfies the client-specific customization requirements 210.

Customization module 112 may use the client-specific data to customize the software program in a variety of ways. For example, customization module 112 may customize the software program using the user's name or organizational affiliation. In another example, customization module 112 may use a software license included with client-specific data 212 to activate software program 126 or selected features of software program 126.

In one embodiment, the client-specific data may include a localization file. The term "localization file," as used herein generally refers to one or more files used to adapt a software program to a language, alphabet or script, writing direction, capitalization convention, punctuation, and/or national conventions, such as systems of measurement, postal address format, currency symbols, or systems of measurement. In one example, customization module 112 may place localization files included in client-specific data 212 in the storage locations used by the software program.

In one embodiment, the client-specific data may include a virtualization container. The term "virtualization container," as used herein generally refers to an operating environment that provides a layer of abstraction between a software program and an operating system. Virtualization containers may enable one version of a software program to execute on multiple operating system versions. In one example, customization module 112 may install a virtualization container specific to the operating environment of client device 202 to enable the software program to execute with minimal additional modification or customization.

As explained above in connection with example method 300 in FIG. 3, the systems described herein may use an inventory of pre-signed download managers, each having a download manager globally unique ID (DMGUID) built into them and stored in a download manager class. Each download manager class may be processed in different ways, such as having different parameters available to be customized, executing on different operating systems, having signatures and/or marketing dress from different companies, and/or being downloadable in different regions or within company-specific networks. When the systems described herein receive a program request, the described systems may take a download manager matching the requested download manager class from inventory and identify client-specific data associated with the program request. The described systems may download the client-specific data with the download manager or store it against the DMGUID to be downloaded in response to a request from the download manager executing on the client at a later time.

The systems described herein may provide a software program deployment service as a white-label solution, with software programs rebranded with the marketing dress of different software vendors. The described systems may also provide a dynamically customized experience within the downloaded application, based on the client-specific data passed into the download flow. Additionally or alternatively, the described systems may control geographic or organization-specific locations where client systems may download the provided software programs.

Figure 6:
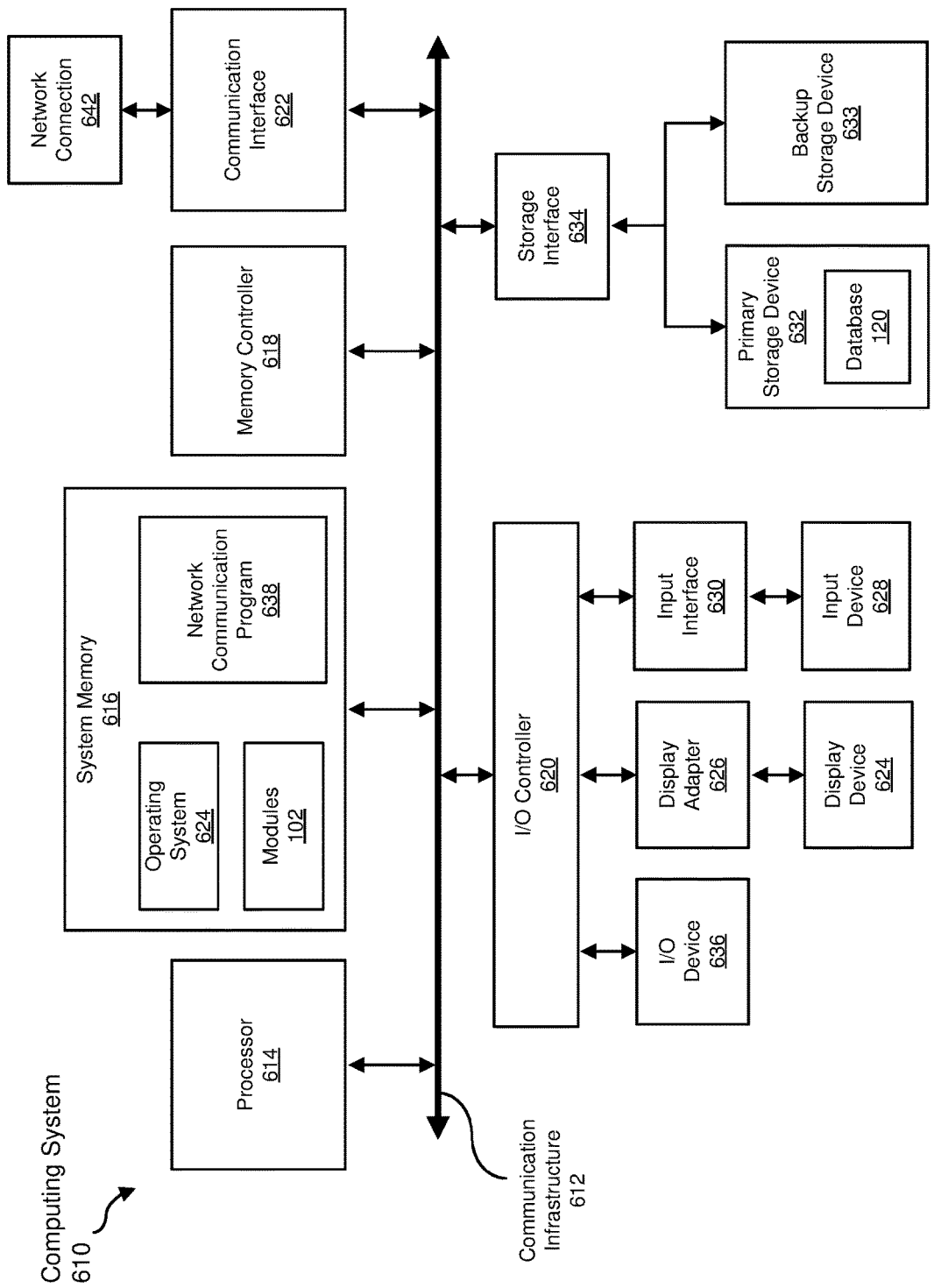
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
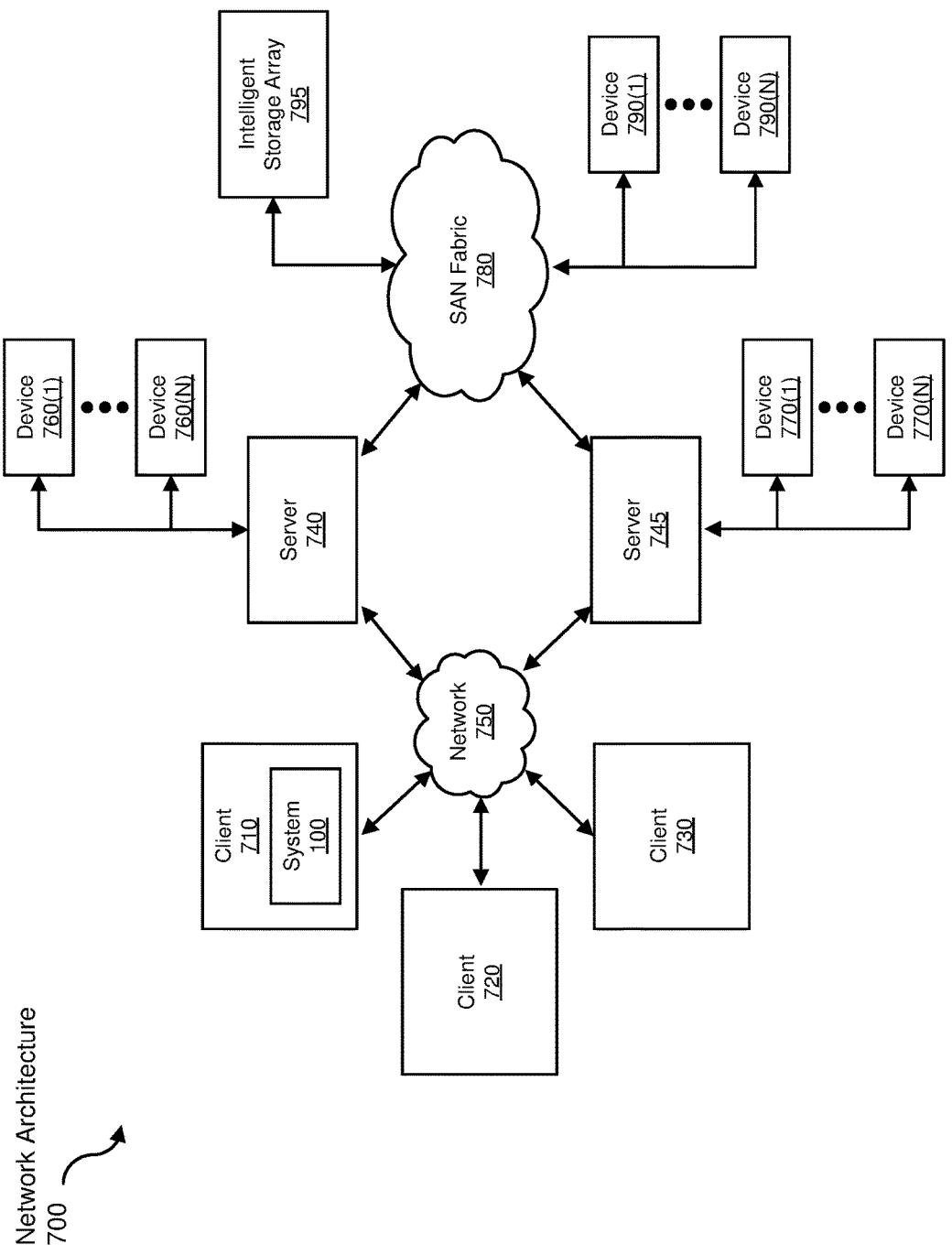
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for dynamically customizing software programs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a program request from a client to be transformed, transform the program request, output a result of the transformation to identify client-specific data for customizing a software program, use the result of the transformation to customize a software program, and store the result of the transformation to record the software program customization performed for the client. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically customizing software programs, at least a portion of the method being performed by a backend computing system comprising at least one processor, the method comprising:
    receiving, from a client device, a request for a software program with client-specific customization requirements; and
    providing, to the client device, a digitally signed download manager for downloading a client-specific version of the software program that satisfies the client-specific customization requirements, wherein the digitally signed download manager is previously digitally signed with a digital signature independent of the client-specific customization requirements and the digitally signed download manager provides the client-specific version of the software program to the client device by:
    downloading, from the backend computing system, both the software program and client-specific data that satisfies the client-specific customization requirements; and
    customizing, using the client-specific data, the software program in a manner that satisfies the client-specific customization requirements while maintaining the digital signature of the digitally signed download manager.

2. The computer-implemented method of claim 1, further comprising generating the digitally signed download manager by:
    including a unique identifier in a file containing executable code for the digitally signed download manager; and
    digitally signing the executable code file to produce the digitally signed download manager.

3. The computer-implemented method of claim 2, wherein providing the digitally signed download manager comprises:
    providing, to the client device, a network location associated with the unique identifier;
    receiving, from the client device at the network location, a request for the digitally signed download manager; and
    in response to receiving the request for the digitally signed download manager, transmitting the digitally signed download manager to the client device from the network location.

4. The computer-implemented method of claim 2, further comprising generating a plurality of digitally signed download managers before receiving the request from the client device.

5. The computer-implemented method of claim 4, wherein:
    each of the plurality of digitally signed download managers is associated with at least one of a plurality of download manager classes; and
    each download manager class is associated with a customized version of the software program.

6. The computer-implemented method of claim 5, further comprising identifying, based on the client-specific data, the download manager class that satisfies the client-specific customization requirements.

7. The computer-implemented method of claim 1, further comprising identifying the client-specific data by at least one of:
- identifying a user associated with the client device;
- identifying an organization associated with the client device;
- identifying a location for the client device;
- identifying a language used by the client device;
- identifying an operating system version used by the client device;
- identifying a network address associated with the client device;
- identifying system configuration information for the client device;
- identifying a software publisher providing the software program to the client device; and
- identifying a license for the software program to be downloaded.

8. The computer-implemented method of claim 1, wherein the client-specific data comprises at least one of:
- a software license;
- a localization file; and
- a virtualization container.

9. A system for dynamically customizing software programs,
the system comprising:
- a receiving module, stored in memory, that receives, from a client device, a request for a software program with client-specific customization requirements;
- a provisioning module, stored in memory, that provides, to the client device, a digitally signed download manager for downloading a client-specific version of the software program that satisfies the client-specific customization requirements, wherein the digitally signed download manager is previously digitally signed with a digital signature independent of the client-specific customization requirements and the digitally signed download manager provides the client-specific version of the software program to the client device by downloading, from the backend computing system, both the software program and client-specific data that satisfies the client-specific customization requirements;
- a customization module, stored in memory, that customizes, using the client-specific data, the software program in a manner that satisfies the client-specific customization requirements while maintaining the digital signature of the digitally signed download manager; and
- at least one physical processor configured to execute the receiving module, the provisioning module, and the customization module.

10. The system of claim 9, further comprising a signing module, stored in memory, that generates the digitally signed download manager by:
- including a unique identifier in a file containing executable code for the digitally signed download manager; and
- digitally signing the executable code file to produce the digitally signed download manager.

11. The system of claim 10, wherein the provisioning module provides the digitally signed download manager by:
- providing, to the client device, a network location associated with the unique identifier;
- receiving, from the client device at the network location, a request for the digitally signed download manager; and
- in response to receiving the request for the digitally signed download manager, transmitting the digitally signed download manager to the client device from the network location.

12. The system of claim 10, wherein the signing module generates a plurality of digitally signed download managers before receiving the request from the client device.

13. The system of claim 12, wherein:
- each of the plurality of digitally signed download managers is associated with at least one of a plurality of download manager classes; and
- each download manager class is associated with a customized version of the software program.

14. The system of claim 13, further comprising an identification module, stored in memory, that identifies, based on the client-specific data, the download manager class that satisfies the client-specific customization requirements.

15. The system of claim 14, wherein the identification module identifies the client-specific data by at least one of:
- identifying a user associated with the client device;
- identifying an organization associated with the client device;
- identifying a location for the client device;
- identifying a language used by the client device;
- identifying an operating system version used by the client device;
- identifying a network address associated with the client device;
- identifying system configuration information for the client device;
- identifying a software publisher providing the software program to the client device; and
- identifying a license for the software program to be downloaded.

16. The system of claim 9, wherein the client-specific data comprises at least one of:
- a software license;
- a localization file; and
- a virtualization container.

17. A non-transitory computer-readable medium comprising one or more computer-readable instructions that, when executed by at least one processor of a computing device, cause the computing device to:
- receive, from a client device, a request for a software program with client-specific customization requirements; and
- provide, to the client device, a digitally signed download manager for downloading a client-specific version of the software program that satisfies the client-specific customization requirements, wherein the digitally signed download manager is previously digitally signed with a digital signature independent of the client-specific customization requirements and the digitally signed download manager provides the client-specific version of the software program to the client device by:
  - downloading, from the backend computing system, both the software program and client-specific data that satisfies the client-specific customization requirements; and
  - customizing, using the client-specific data, the software program in a manner that satisfies the client-specific customization requirements while maintaining the digital signature of the digitally signed download manager.

18. The non-transitory computer-readable medium of claim 17, wherein the one or more computer-readable instructions cause the computing device to generate the digitally signed download manager by:
- including a unique identifier in a file containing executable code for the digitally signed download manager; and
- digitally signing the executable code file to produce the digitally signed download manager.

19. The non-transitory computer-readable medium of claim 18, wherein the one or more computer-readable instructions cause the computing device to:
- provide, to the client device, a network location associated with the unique identifier;
- receive, from the client device at the network location, a request for the digitally signed download manager; and
- in response to receiving the request for the digitally signed download manager, transmit the digitally signed download manager to the client device from the network location.

20. The non-transitory computer-readable medium of claim 19, wherein the one or more computer-readable instructions cause the computing device to generate a plurality of digitally signed download managers before receiving the request from the client device.

* * * * *